United States Patent [19]

Osenkowski

[11] Patent Number: 4,603,894
[45] Date of Patent: Aug. 5, 1986

[54] LOCK AND HANDLE MODULE FOR VEHICLE DOOR

[75] Inventor: Joseph M. Osenkowski, Detroit, Mich.

[73] Assignee: General Motors Corporation, Detroit, Mich.

[21] Appl. No.: 592,357

[22] Filed: Mar. 22, 1984

[51] Int. Cl.[4] ............................................. E05C 3/26
[52] U.S. Cl. .................................. 292/216; 292/337; 292/DIG. 25; 296/146
[58] Field of Search ............... 292/216, 280, 337, 346, 292/DIG. 25, DIG. 23; 49/502, 503; 296/146

[56] References Cited

U.S. PATENT DOCUMENTS

| | | | |
|---|---|---|---|
| 1,756,313 | 4/1930 | Taffe | 292/DIG. 25 X |
| 1,833,945 | 12/1931 | Janonis | 292/DIG. 25 |
| 1,904,970 | 4/1933 | Cook | 292/DIG. 23 X |
| 2,987,907 | 6/1961 | Cockburn et al. | 292/DIG. 25 |
| 3,525,545 | 8/1970 | Leslie | 292/216 |
| 3,606,426 | 9/1971 | Zaydel | 292/216 |
| 3,695,663 | 10/1972 | Cockburn | 292/216 |
| 3,791,693 | 2/1974 | Hellriegel et al. | 49/502 |
| 3,837,191 | 9/1974 | Saiderer | 292/346 X |
| 3,848,909 | 11/1974 | Foley | 292/216 |
| 4,052,094 | 10/1977 | Widén | 292/337 X |

Primary Examiner—Richard E. Moore
Attorney, Agent, or Firm—Charles E. Leahy

[57] ABSTRACT

The door lock assembly, the inside door handle, the power lock actuator, the various bell crank levers, and the connecting rods acting therebetween are assembled upon a module frame off the assembly line to enable construction of a preassembled and tested door lock and handle module for subsequent mounting on the vehicle door. The module frame has a longitudinal extending stiffening flange along the upper margin thereof. A molded plastic cover fits over the assembled module and cooperates with the module frame and its stiffening flange to enclose the door lock rod in order to prevent unauthorized entry into the vehicle body by the insertion of a tool between the door outer panel and the window glass to actuate the door lock rod.

1 Claim, 5 Drawing Figures

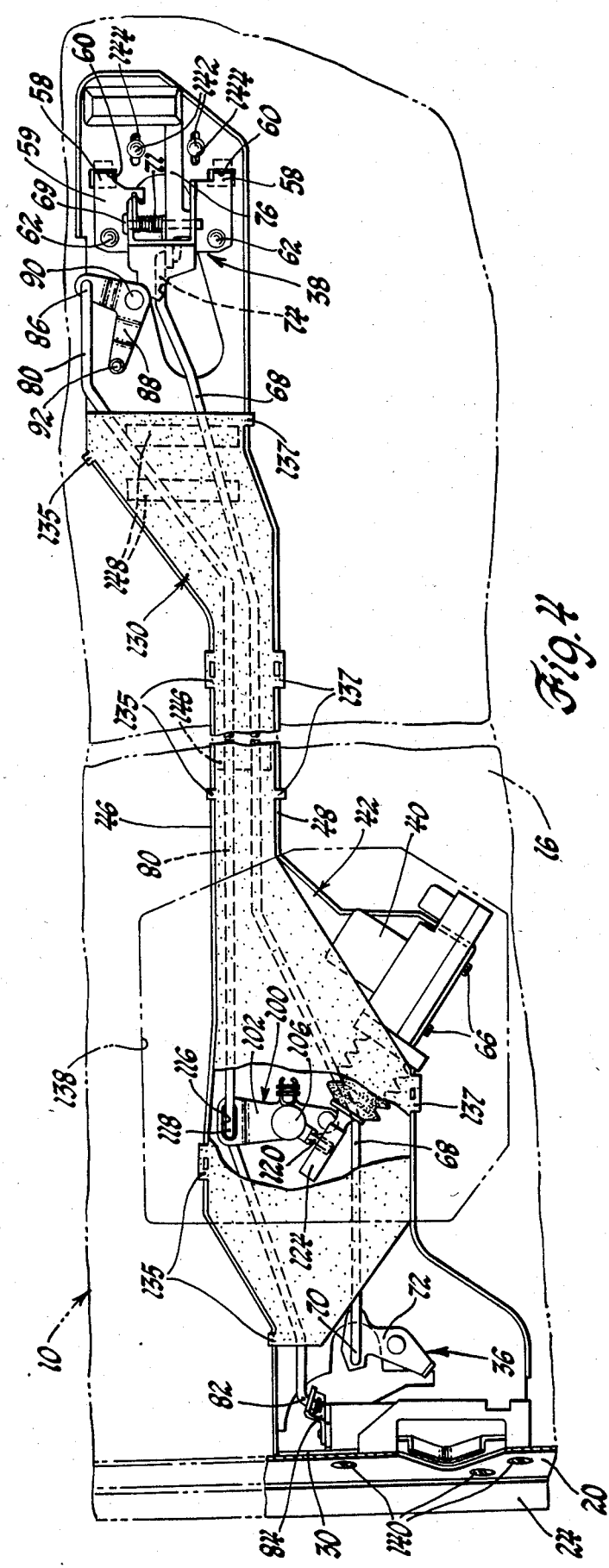
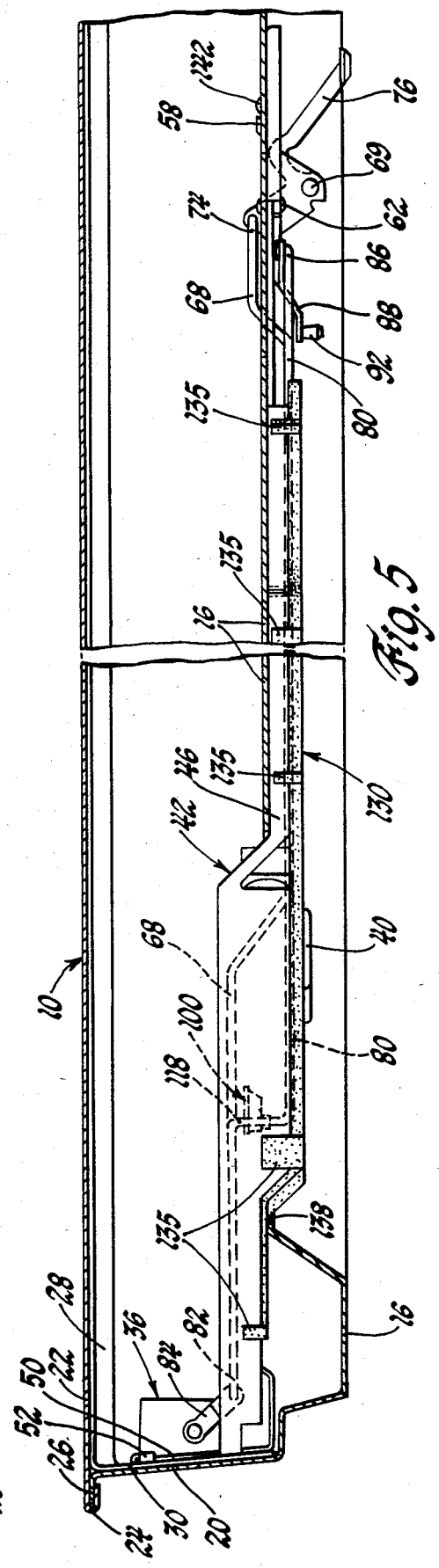

LOCK AND HANDLE MODULE FOR VEHICLE DOOR

This invention relates to a motor vehicle door and more particularly provides an assembly module by which the door lock, the remote inside handle, and connecting rods are mounted on a module frame and connected relative one another for testing prior to mounting in the vehicle door.

BACKGROUND OF THE INVENTION

Conventional motor vehicle doors are comprised of a door inner panel, a door outer panel, and a door guard beam panel joined together and mounted on the vehicle body by a pair of hinges permitting swinging movement of the door between open and closed positions.

The door inner panel is a sheet metal stamping which extends longitudinally the full length of the door and has front and rear end walls which extend outwardly and have flanges over which the door outer panel is hem flanged. The door guard beam panel is adhesively bonded to the door outer panel and has its ends welded or otherwise attached to the end walls of the inner panel.

A door lock assembly is mounted on the rear end wall of the door inner panel and has a latch bolt adapted to engage a striker mounted on the body pillar to latch the door in a closed position. An inside handle assembly is mounted on the door inner panel remote from the door lock assembly and connected thereto by an inside handle connecting rod. In addition, an inside lock handle is mounted in conjunction with the inside handle assembly or separately mounted on the door inner panel and connected to the door lock assembly by a lock rod to lock and unlock the door lock assembly. In some doors, power lock actuators are mounted on the door inner panel to operate the lock rod. Depending upon the geometry of door latch and lock system, bell cranks may be mounted on the door inner panel and cooperate with the rods to translate vertical motion into horizontal motion or vice versa.

Because of variation in the stamped shape of the panels, and variation in the welding, flanging and adhesive assembly operations joining the panels, the location of the rear end wall upon which the door lock assembly is mounted will vary somewhat relative the mounting holes provided in the door inner panel for mounting the inside handle assembly, the power lock actuator and whatever bell cranks might be required. Accordingly, it is common practice that such mounting holes be slotted to enable some adjustment of the mounting location of the inside handle assembly, power lock actuator, etc.

In the vehicle assembly plant, the lock assembly, the inside handle assembly, the power lock actuator, and whatever bell cranks are necessitated by the geometry of the system are independently mounted on the door inner panel by rivets, screws, or the like. The connecting rods extending between the inside handle assembly and the door lock assembly and between the manual inside lock handle or power door lock actuator and the door lock assembly are then snaked through access openings in the door inner panel and the appropriate connections are made. The various actuating elements are then cycled and inspected for proper functioning and any adjustments in the relative mounting locations are made in order to assure proper operation of the door latching and locking functions prior to concealing the inner workings of the door by a trim panel mounted on the inside of the door.

It would be desirable to provide an improved apparatus for assembling of vehicle door lock and handle assemblies in order to eliminate concerns with stamping and assembly variations resulting in variation in the mounting distances between the door lock assembly and the various operating elements and to enable assembly and testing of the door lock assembly and the various operating elements off the assembly line.

SUMMARY OF THE INVENTION

According to the present invention the door lock assembly, the inside door handle, the power lock actuator, the various bell crank levers, and the connecting rods acting therebetween are assembled upon a module frame off the assembly line to enable construction of a preassembled and tested door lock and handle module for subsequent mounting on the vehicle door.

The module frame is comprised of a sheet metal stamping adapted to extend longitudinally within the door and having a longitudinal extending planar portion at the forward end for mounting the inside handle assembly and a lateral extending flange at the rearward end for abutting against the rear end wall of the door and mounting the door lock assembly. The electric door lock actuator is also mounted on the module frame as well as whatever bell crank levers are necessitated by the geometry and arrangement of the particular vehicle. The inside handle connecting rod extends between the inside handle assembly and the door lock assembly to permit the occupant to unlatch the door for swinging movement. A door lock rod extends between the inside lock handle and the door lock assembly to lock and unlock the door lock assembly.

The door lock and handle module, including the door lock assembly, the inside handle assembly, the power lock actuator, the connecting rods and bell crank levers, are assembled and tested prior to mounting of the module upon the door inner panel. The lateral flange of the module frame may yield somewhat relative the longitudinal extending planar portion to accommodate the variation in the door.

The module frame preferably has a longitudinal extending stiffening flange at least along the upper margin thereof. A cover assembly, preferably of molded plastic, fits over the assembled module and overlies the stiffening flange of the module frame to cooperate with the module frame in enclosing the door lock rod in order to prevent unauthorized entry into the vehicle body by the insertion of a tool between the door outer panel and the window glass to actuate the door lock rod.

Thus, the object, feature and advantage of the invention resides in the provision of a module frame having the door lock assembly and the remote inside handle assembly mounted thereon and connected by the inside handle rod to enable assembly and testing of the door lock and handle components prior to mounting on the vehicle door.

Another feature, object or advantage of the invention resides in the provision of a door lock and handle module assembly including a cover and a stiffening flange at the upper margin of the modular frame which cooperate to overlie and enclose the lock rod extending from the inside handle assembly to the door lock assembly to prevent tampering with the lock rod to gain unauthorized entry into the vehicle.

BRIEF DESCRIPTION OF THE DRAWINGS

These and other features, objects and advantages of the invention will become apparent upon consideration of the specification and the appended drawings in which:

FIG. 4 is a side elevation view of the lock and handle module;

FIG. 5 is a top view of the lock and handle module.

DESCRIPTION OF THE PREFERRED EMBODIMENT

Figure 1:
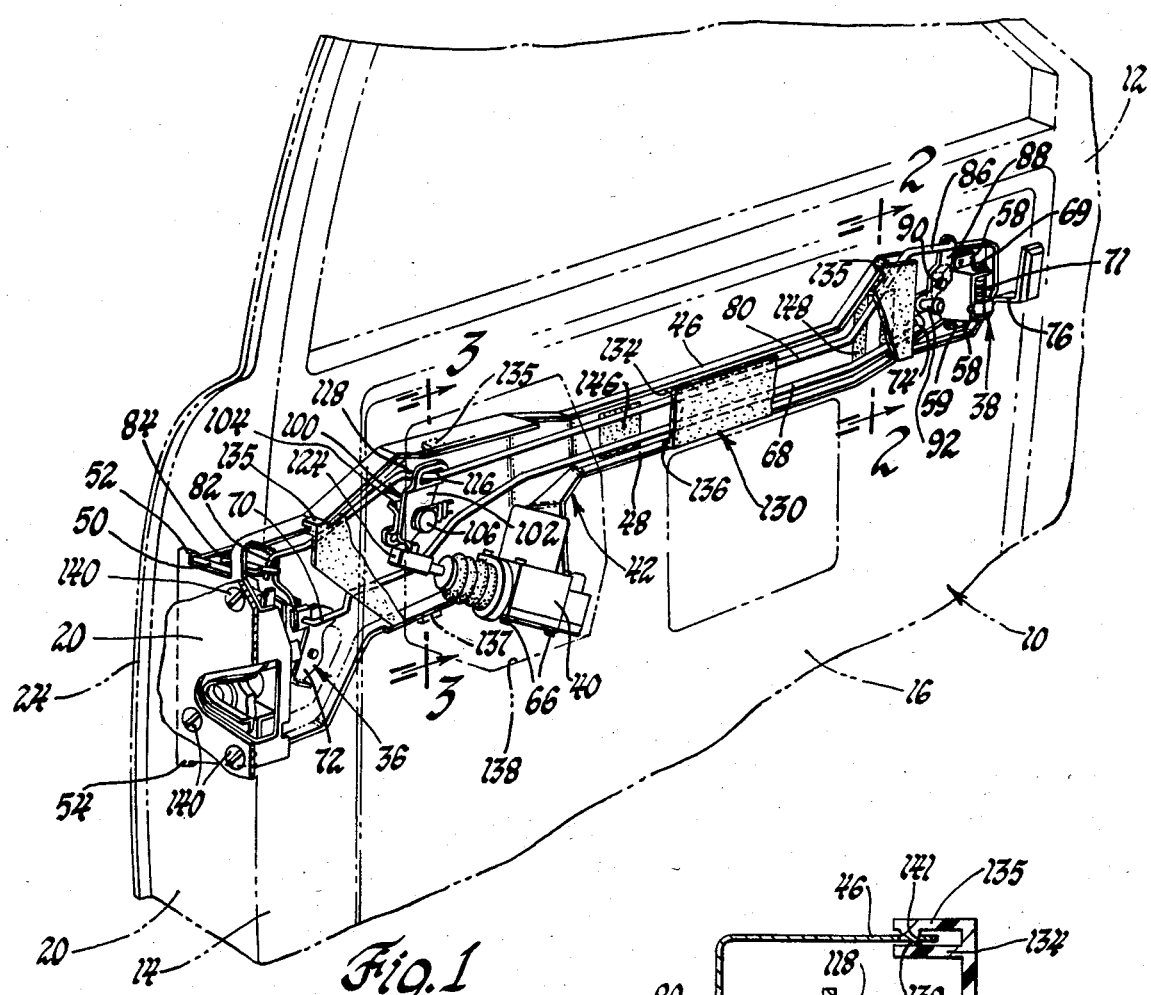
FIG. 1 is a perspective view of a vehicle door having a door lock and handle module according to the invention and having the cover assembly broken away.

Referring to FIG. 1, there is shown a vehicle body door 10 having a front end 12 adapted for hinged mounting on the vehicle body and a rear end 14 adapted for swinging movement between open and closed positions. As best seen in FIGS. 1 and 5, the door 10 includes a door inner panel 16 which is a sheet metal stamping extending generally longitudinally of the vehicle and having a transverse extending rear end wall 20 which defines the rear end wall of the door 10. The door also includes a door outer panel 22 which is a sheet metal stamping defining the visible outer contour of the door and having a hem flange 24 at the rear edge margin thereof which folds over a flange 26 of the inner panel rear end wall 20 to attach the door inner and outer panels. The door 10 also has a door impact beam 28 which is a channel-shaped sheet metal stamping having an integral transverse extending rear wall 30 which abuts against the transverse rear end wall 20 of the door inner panel 16 and is welded thereto. The door impact beam 28 is adhesively secured to the door outer panel 22 along the length thereof.

A door lock assembly 36, inside door handle assembly 38 and power door lock actuator 40 are all mounted upon a module frame 42 which is in turn mounted upon the door 10. The module frame 42 is a sheet metal stamping which, as best seen in FIG. 1, extends longitudinally from the rear end wall 20 of the door inner panel 16 to the forward region of the door. Module frame 42 has an integral stiffening flange 46 extending along the top thereof and an integral stiffening flange 48 extending along the bottom. At the rear end of the module frame 42 there is provided an integral outward extending transverse module frame end wall 50 which is adapted to abut against the rear end wall 30 of the impact beam 28.

The module frame 42 serves as a backbone upon which the door lock assembly 36, inside door handle assembly 38 and power door lock actuator 40 may be mounted as a subassembly prior to mounting upon the vehicle door indicated in phantom line in FIG. 1. More particularly, module frame 42 is preferably mounted on a fixture or work table. The door lock assembly 36 is mounted upon the module frame end wall 50 by a pair of tabs 52 and 54 which are respectively provided on the top and bottom edge walls of the module frame end wall 50 and are bent over the adjacent wall of the door lock assembly 36. Reference may be had to U.S. Pat. No. 3,695,663 by Stanley D. Cockburn, issued Oct. 3, 1972, for a description of the construction and operation of one example of a door lock assembly 36.

Likewise, the handle assembly 38 is mounted on the forward end of the module frame 42. This connection of the inside handle assembly to the module frame 42 is conveniently achieved by fitting a pair of outwardly outset mounting tangs 58 of the housing 59 of the handle assembly 38 into a pair of oversized apertures 60 provided in the module frame 42. The attachment is completed by a pair of rivets 62 or other suitable fasteners which are installed through apertures provided in both the handle assembly housing 59 and the module frame 42.

An electric power door lock actuator 40 is attached to the module frame 42 by screws 66 which extend through the lower flange 48.

As best seen in FIGS. 1 and 4, an inside handle connecting rod 68 extends between the door lock assembly 36 and the inside handle assembly 38. More particularly, the rear end 70 of the inside handle connecting rod 68 is bent outwardly and extends into a hole in lever 72 of the door lock assembly 36 so that fore and aft shifting movement of the inside handle connecting rod 68 will pivot the lever 72. The forward end 74 of the inside connecting handle rod 68 is pivotally connected to an inside door handle 76 which is pivoted to the handle assembly housing 59 by pin 69 and spring 71 so that a pivoting movement of the handle 76 by the vehicle occupant will shift the inside handle connecting rod 68 forwardly to in turn pivot the lever 72 of door lock assembly 36 and unlatch the door.

A lock rod 80 also extends between the door lock assembly 36 and the inside handle assembly 38. More particularly, the rear end 82 of the lock rod 80 is bent downwardly and extends through an aperture in a lever 84 which is pivotally mounted and connected to the door lock assembly 36 in a manner to lock and unlock the door lock assembly 36. The forward end 86 of the lock rod 80 is bent outwardly and extends through an aperture in a lock lever 88 which is pivotally mounted on the housing 59 of the handle assembly 38 by a pivot 90. The other end of the lock lever 88 has a knob 92 by which the vehicle occupant may pivot the lock lever 88 up and down and in so doing shift the lock rod 80 forwardly and rearwardly to lock and unlock the door lock assembly 36.

Figure 3:
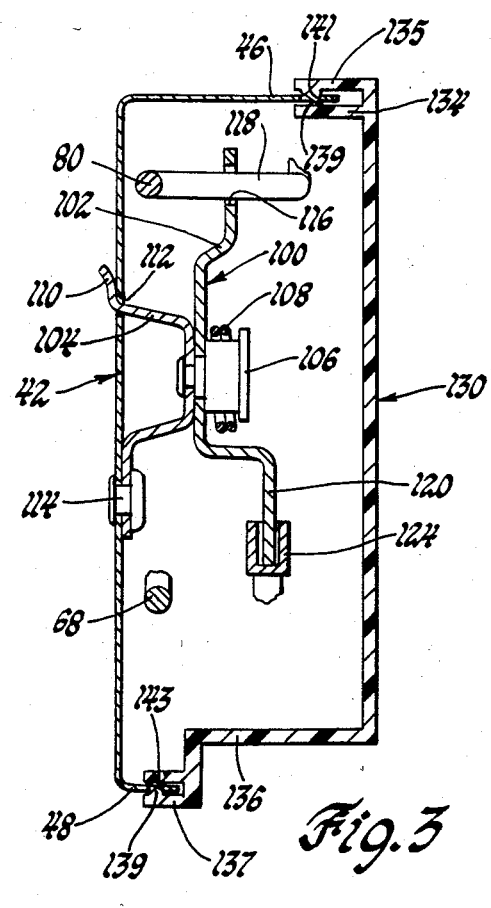
FIG. 3 is a sectional view taken in the direction of arrows 3—3 of FIG. 1.

As best seen in FIGS. 3 and 4 a bell crank assembly, generally indicated at 100, is provided to interconnect the power lock actuator 40 and the lock rod 80. More particularly, as best seen in FIG. 3, the bell crank assembly 100 includes a bell crank lever 102 which is pivotally mounted on a mounting bracket 104 by a pivot 106 and biased to a predetermined rotary position by a spring 108. Mounting bracket 104 has a mounting tang 110 which can be inserted into an aperture 112 in the module frame 42. The attachment of the mounting bracket 104 is completed by installation of a rivet 114 which extends through aligned holes in the mounting bracket 104 and the module frame 42. The upper end of the bell crank lever 102 has an oversized slot 116 which surrounds a laterally offset portion 118 of the lock rod 80. The lower end of the bell crank 102 has a finger 120 which extends into a socket 124 mounted on the armature of the power lock actuator 40. Accordingly, electrical energization of the power lock actuator 40 will pivot the bell crank lever 102 back and forth to operate the lock rod 80 and thereby lock and unlock the door lock assembly 36.

The aforedescribed subassembly of the door lock assembly 36, the inside door handle assembly 38 and the power lock actuator 40 onto the module frame 42 is performed on a fixture or work table off the assembly line. Accordingly, this subassembly operation can be performed either in the assembly plant or in the fabricating plant. In either case the lock and handle module can be tested for proper latching and locking operation prior to mounting within the vehicle door.

Figure 2:
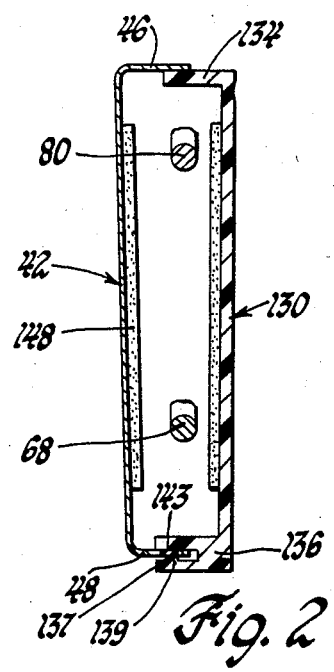
FIG. 2 is a sectional view taken in the direction of arrows 2—2 of FIG. 1.

As best seen in FIGS. 2, 3 and 4, a cover assembly, generally indicated at 130 is provided for enclosing the inside handle connecting rod 68 and the lock rod 80. The cover assembly 130, preferably of molded plastic, has a general channel shape as best seen in FIG. 3 and includes a top wall 134 which extends adjacent to the flange 46 of the module frame 42 and a bottom wall 136 which extends adjacent to the stiffening flange 48 at the bottom of the module frame 42. The cover 130 is attached to the module frame 42 by a plurality of integral locking tabs 135 which extend parallel with the top wall 134 and a plurality of locking tabs 137 which extend parallel with the bottom wall 136. For each of the locking tabs 135 and 137 have barbs 139 which snap into holes 141 and 143 provided respectively in the flange 46 and flange 48. As best seen in FIGS. 4 and 5, the cover 130 extends nearly the full length of the module frame 42 from the door lock assembly 36 of the rear end thereof to the handle assembly 38 at the forward end thereof. The cover 130 cooperates with the module frame 42 to enclose the lock rod 80 in order to prevent unauthorized entry into the motor vehicle by the insertion of a tool between the door outer panel and the window glass to actuate the door lock rod 80. The cover also protects the rods from contact with acoustic materials which are often installed in the vehicle doors.

The preassembled and pretested lock and handle module is installed in the vehicle door in the assembly plant after the door is painted. The rear end of the lock and handle module and the lock assembly 36 carried thereby is snaked through the large access opening 138 provided in the door inner panel 16. The rear end of the lock and handle module is attached to the vehicle door by a plurality of screws 140 which extend through aligned countersunk apertures in the rear end wall 20 of the door inner panel, the rear end wall 30 of the impact beam 28, and the end wall 50 of the module frame 42. The screws are threadedly engaged in threaded bosses which are formed integrally with the housing of the door lock assembly 36. Accordingly, the installation of these screws 140 fixedly mounts the door lock assembly 36 and the module frame 42 in their proper locations on the door 10 for the latching engagement of the door lock assembly with the striker pin mounted on the vehicle body pillar. The forward end of the lock and handle module is mounted on the door inner panel by rivets 142 which extend through slotted apertures 144 provided in the module frame 42.

As best seen in FIGS. 1 and 4 antirattle pads 146 and 148 of felt, plastic, or the like are adhesively secured on the module frame 42 to prevent the inside handle connecting rod 68 and lock rod 80 from rattling against the module frame as a result of vehicle vibration. Alternatively, the antirattle function may be provided by plastic clips secured to the module frame 42 and cover 130.

In view of the foregoing description of the preferred embodiment, it will be appreciated that the mounting of the vehicle door lock assembly and the handle assembly as well as the power lock actuator upon a module frame permit the door lock and handle system to be tested for proper operation of the door latch prior to their mounting upon the vehicle door. As a result the proper functioning of the door lock and handle is assured when the door lock and handle module is installed in the vehicle door on the assembly line.

The embodiments of the invention in which an exclusive property or privilege is claimed are defined as follows:

1. In a longitudinal extending vehicle body door hingedly mounted on a vehicle body and having a door lock assembly mounted on a transverse extending rear wall of the free swinging end of the door for latching the door in the closed position and an inside handle assembly located longitudinally forward and remote from the door lock assembly and connected to the door lock assembly by a fixed length inside handle connecting rod for enabling a vehicle occupant to unlatch the door lock assembly from inside the occupant compartment and said inside handle assembly having a lock handle connected to the door lock assembly by a lock to lock and unlock the door lock assembly, the improvement comprising:

a stamped metal frame having a transverse extending rear end wall adapted to abut against the transverse extending rear end wall of the door and a longitudinally extending forward end portion adapted to reach forwardly to a location providing occupant accessible mounting of the remote inside handle assembly, said frame having top and bottom edges with integral stiffening flanges projecting therefrom and at least said upper flange overlying the connecting rod;

first means attaching the door lock assembly on the transverse extending rear end wall of the frame and second means independent from the first means attaching the inside handle assembly on the forward end portion of the frame to establish the relative mounting locations of the door lock assembly and the inside handle assembly at a fixed length longitudinal spaced apart relationship relative one another so that attachment of the fixed length connecting rod therebetween reliably effects unlatching movement of the door lock assembly upon operator actuation of the inside handle assembly independently of mounting of the door lock assembly and inside handle assembly on the vehicle door;

means attaching the frame on the vehicle door so that the transverse extending rear end wall of the frame and the door lock assembly mounted thereon are mounted upon the transverse extending rear end wall of the door and the inside handle assembly is mounted upon the door remote from the door lock and at a predetermined consistent fixed length spacing therefrom to assure proper operation of the door lock assembly by the remote inside handle; and a cover mounted on the integral stiffening flanges of the frame and cooperating therewith to substantially enclose the lock rod to prevent tampering with the lock rod and unauthorized entry into the vehicle.

* * * * *